United States Patent
Pellerin (10) Patent No.: US 12,297,758 B2
(45) Date of Patent: May 13, 2025

(54) BYPASS VALVE

(71) Applicant: Pratt & Whitney Canada Corp., Longueuil (CA)

(72) Inventor: Hugues Pellerin, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 106 days.

(21) Appl. No.: 18/151,424

(22) Filed: Jan. 7, 2023

(65) Prior Publication Data
US 2024/0229688 A1    Jul. 11, 2024

(51) Int. Cl.
| F01M 1/02 | (2006.01) |
| F01M 1/16 | (2006.01) |
| F16K 11/07 | (2006.01) |
| F16K 31/122 | (2006.01) |

(52) U.S. Cl.
CPC ........ *F01M 1/02* (2013.01); *F01M 1/16* (2013.01); *F16K 11/07* (2013.01); *F16K 31/1221* (2013.01)

(58) Field of Classification Search
CPC ........ F01D 25/20; F05D 2260/98; F01M 1/02
See application file for complete search history.

(56) References Cited

U.S. PATENT DOCUMENTS

| 5,111,653 | A | * | 5/1992 | Leeson | F02C 7/232 60/734 |
| 5,215,444 | A | * | 6/1993 | Bishoff | F15B 21/045 60/329 |
| 5,711,145 | A | * | 1/1998 | Perkey | F02C 7/228 60/734 |
| 8,887,869 | B2 | * | 11/2014 | Pisseloup | F02C 7/06 184/6.11 |
| 9,238,975 | B2 | * | 1/2016 | Detry | F16K 17/046 |
| 10,450,965 | B2 | * | 10/2019 | Ozzello | F02C 7/228 |
| 11,686,219 | B2 | * | 6/2023 | Molesini | F16H 57/0479 60/39.08 |
| 2010/0012434 | A1 | * | 1/2010 | Pisseloup | F02C 7/06 184/6.11 |
| 2013/0205745 | A1 | * | 8/2013 | Detry | F16K 17/046 60/39.08 |
| 2014/0090355 | A1 | * | 4/2014 | James | F02K 3/00 60/39.08 |
| 2016/0160714 | A1 | * | 6/2016 | James | F02C 7/32 60/39.08 |
| 2016/0245117 | A1 | * | 8/2016 | Parnin | F16N 39/002 |

(Continued)

FOREIGN PATENT DOCUMENTS

EP    1047867 B1    3/2003

OTHER PUBLICATIONS

Partial European Search Report dated Apr. 8, 2024, EP 24150788.8 filed Jan. 8, 2024.

*Primary Examiner* — Michael A Riegelman
(74) *Attorney, Agent, or Firm* — NORTON ROSE FULBRIGHT CANADA LLP (57) ABSTRACT

A fluid system for an aircraft engine can include a pumped fluid circulation circuit including a fluid tank, the fluid circulation circuit configured to circulate a fluid through at least a part of the aircraft engine and means, in the fluid circulation circuit, for selectively directing the fluid of the fluid circulation circuit as a function of a pressure of fluid in the fluid circulation circuit to one of: a part of the aircraft engine, and a fluid bypass in the fluid circulation circuit that is fluidly upstream of the part.

5 Claims, 7 Drawing Sheets

(56) References Cited

U.S. PATENT DOCUMENTS

| | | | | |
|---|---|---|---|---|
| 2021/0010392 A1* | 1/2021 | Molesini | ................ | F01M 11/00 |
| 2021/0254506 A1* | 8/2021 | Legare | ...................... | F16N 7/38 |
| 2022/0397060 A1* | 12/2022 | Winter | ...................... | F02C 7/06 |
| 2023/0027703 A1* | 1/2023 | Pellerin | ............... | F16K 31/1221 |
| 2024/0229688 A1* | 7/2024 | Pellerin | ................... | F01D 25/20 |

* cited by examiner

BYPASS VALVE

TECHNICAL FIELD

The present disclosure relates to valves, and more particularly to bypass valves.

BACKGROUND

Valves are commonly used in oil systems as they allow for an open path at a given point in the engine operation to a location where oil was not flowing prior the valve opening. Valves can also be used to close a given path under certain operating conditions. In certain applications, valve opening and closing can be triggered by one or more mechanisms and thresholds depending on the given application. The valve may use one or two reference fluids to balance the piston position.

There is always a need in the art for improvements to valves and valve systems in the aerospace industry. This disclosure provides a solution for this need.

SUMMARY

In accordance with at least one aspect of this disclosure there is provided a system. In embodiments, the system can include a first pump configured to drive oil to from an oil tank to a cavity of an aircraft engine, a second pump configured drive spent oil from the cavity back to the oil tank, and a valve disposed downstream of the first pump and upstream of the cavity. In certain embodiments, the first pump can be a pressure pump and in certain embodiments the second pump can be a scavenge pump. In certain embodiments, the valve can be a passive valve.

In embodiments, the valve can be configured to provide flow to the second pump in both a first state and a second state of the valve to continuously lubricate the second pump regardless of the state of the valve. In embodiments, in the first state of the valve, flow from the oil tank is allowed to pass from the valve directly to the second pump and is blocked from passing to the cavity, and in the second state of the valve, flow from the oil tank is allowed to pass from the valve to the cavity and is blocked from passing directly to the second pump.

In certain embodiments, the system can include the oil tank disposed upstream of the first pump and downstream of the second pump and the cavity disposed downstream of the first pump and upstream of the second pump.

In embodiments, the system can include a primary conduit for fluidly communicating in series, the oil tank, the first pump, the valve, the cavity, and the second pump. In embodiments, the system can include a bypass conduit for fluidly communicating in series, the valve, and the second pump, bypassing the cavity.

In embodiments, in the first state of the valve, the valve can be configured to block flow from the first pump from passing though the valve to the cavity via the primary conduit and to allow flow from the first pump to pass through the valve to the second pump via the bypass conduit. In embodiments, in the second state of the valve, the valve can be configured to allow flow from the first pump to pass though the valve to the cavity via the primary conduit and to block flow from the first pump from passing through the valve to the second pump via the bypass conduit.

In certain embodiments, the valve can be configured to move between the first state and the second state based on a single pressure reference. In certain embodiments, the single pressure reference can be a low pressure air flow fluidly connected to a vent of the oil tank. In certain such embodiments, in the first state of the valve, a pressure of the oil flow on a first side of the valve can be less than a pressure of the low pressure air flow and a bias force on a second side of the valve such that the low pressure air maintains the valve in the first state. In the second state of the valve, the pressure of the oil flow on the first side of the valve can be greater than the pressure of the low pressure air flow and the bias force on the second side of the valve such that the pressure of the oil flow maintains the valve in the second state.

In certain embodiments, the valve can be configured to move between the first state and the second state based on two pressure references. In certain embodiments, a first pressure reference can be a low pressure air flow fluidly connected to a vent of the oil tank and a second pressure reference can be a high pressure air flow fluidly connected to compressor section of the aircraft engine. In certain such embodiments, in the first state of the valve, a pressure of the high pressure air flow on a first side of the valve can be less than a pressure of the low pressure air flow and a bias force on a second side of the valve such that the low pressure air maintains the valve in the first state. In the second state of the valve, the pressure of the high pressure air flow on the first side of the valve can be greater than the pressure of the low pressure air flow and the bias force on the second side of the valve such that the pressure of the high pressure air flow maintains the valve in the second state.

In embodiments, the first state of the valve can correspond to a startup and/or transient (e.g., ramp up) condition of the aircraft engine and the second state of the valve can correspond to an operational and/or idle condition of the aircraft engine.

In accordance with at least one aspect of this disclosure, there is provided a valve. The valve includes a valve housing defining a flow inlet, first flow outlet, a second flow outlet, and a reference port. The valve includes a piston within the valve housing configured to move within the housing between a first position fluidly communicating the flow inlet and the first flow outlet and a second position fluidly communicating the flow inlet and the second flow outlet. The valve further includes a biasing member inside the housing and axially between connected to the piston and an end of the valve housing, the biasing member biasing the piston to the first position and having a biasing strength selected to be overcome by a predefined pressure acting on the piston and to thereby allow the piston to move toward a position corresponding to the second state as a function of the pressure acting on the piston which actuates the piston between a first position and the second position of the piston.

In certain embodiments, the valve housing can define a longitudinal axis extending from an opening of the flow inlet to an opening of the reference port, the piston configured to translate axially within the valve housing along the longitudinal axis. In certain such embodiments, an opening of the first flow outlet and an opening of the second flow outlet can be oriented orthogonal to the longitudinal axis.

In certain embodiments, the reference port can be a first reference port, and the valve can include a second reference port defined in the valve housing opposite the first reference port. In certain such embodiments, the biasing member can be configured to bias the piston to the first position and configured to allow the piston to move to the second position based on pressure at the first reference port and the second reference port. In certain embodiments, the valve housing can define a longitudinal axis extending from an opening of the first reference port to an opening of the second reference port, the piston configured to translate axially within the valve housing along the longitudinal axis. In certain such embodiments, an opening of the flow inlet, an opening of the first flow outlet, and an opening of the second flow outlet can be oriented orthogonal to the longitudinal axis.

In certain embodiments, the flow inlet and the first flow outlet can be different sizes, and the flow inlet and the second flow outlet can be the same size. In certain embodiments, the flow inlet, the first flow outlet, and the second flow outlet can all be same size. In embodiments, the valve can be or can include an oil delay valve.

In accordance with at least one aspect of this disclosure, there is provided a fluid system for an aircraft engine. In embodiments, the fluid system can include a pumped fluid circulation circuit including a fluid tank, the fluid circulation circuit configured to circulate a fluid through at least a part of the aircraft engine, means, in the fluid circulation circuit, for selectively directing a fluid of the fluid circulation circuit as a function of a pressure of fluid in the fluid circulation circuit to one of a part of the aircraft engine, and a fluid bypass in the fluid circulation circuit that is fluidly upstream of the part.

In embodiments, the means for selectively directing the fluid can include a normally-closed valve disposed, when the fluid system is in use, fluidly between an inlet of the fluid bypass and an inlet of the part of the aircraft and a normally-open valve disposed in the fluid bypass. In embodiments, the normally-closed valve can be openable by fluid in the fluid circulation circuit acting on an inlet of the normally-closed valve when pressure of the fluid at the inlet of the normally-closed valve exceeds a first predefined pressure threshold and the normally-open valve can be closeable by fluid in the fluid circulation circuit acting on an inlet of the normally-open valve when pressure of the fluid at the inlet of the normally-open valve exceeds a second predefined pressure threshold. In embodiments, the first predefined pressure threshold can be one of: lower than the second predefined pressure threshold, and/or equal to the second predefined pressure threshold.

In embodiments, the means for selectively directing the fluid includes a valve in the fluid circulation circuit. The valve can include an inlet disposed fluidly upstream of an inlet of the fluid bypass, a first outlet fluidly connected to the inlet of the valve and to the inlet of the fluid bypass, a second outlet fluidly connected to the inlet of the valve and to an inlet of the part of the aircraft engine when the fluid system is installed in the aircraft engine, and means for diverting at least substantially all fluid flow from the inlet to one of the first outlet and the second outlet as fluid pressure at the inlet of the valve rises above a predefined pressure threshold.

In accordance with at least one aspect of this disclosure, there is provided a valve for an aircraft fluid system. The valve can have a valve housing defining a flow inlet, a first flow outlet fluidly connected to the flow inlet, and a second flow outlet fluidly connected to the flow inlet. A body can be included within the valve housing moveable within the housing between a first state in which the body fluidly connects the flow inlet to the first flow outlet while fluidly disconnecting the flow inlet from the second flow outlet and a second state in which the body fluidly connects the flow inlet to the second flow outlet while fluidly disconnecting the flow inlet from the first flow outlet. A biasing member can be operatively connected to the body and biasing the body to the first state.

In embodiments, a construction of the body and a biasing strength of the biasing member can be selected such that when a fluid of the aircraft fluid system acts at a predefined pressure on the body through the flow inlet, a force produced by the fluid on the body overcomes the biasing strength and thereby moves the body toward the second position.

In embodiments, the valve can include a reference port fluidly open to the body at a location relative to the body that is selected such that fluid pressure applied to the reference port opposes fluid pressure applied to the flow inlet. In certain embodiments, the housing can be cylindrical and the body can be a piston translatable within the cylindrical housing.

In embodiments, the piston can be translatable axially in the housing and has opposed axial sides, the flow inlet can be disposed on one of the opposed axial sides, and the reference port is fluidly open to the other one of the opposed axial sides. In certain embodiments, the flow inlet and the first flow outlet can be different sizes, and wherein the flow inlet and the second flow outlet can be the same size.

In accordance with at least one aspect of this disclosure, there is provided an aircraft engine. The aircraft engine can include any one or more of the valves as described herein. In embodiments, the engine can include a compressor section fluidly connected to air to a cavity of the aircraft engine, a pumped oil circulation circuit including an oil tank and the cavity, and a bypass conduit fluidly connecting the first flow outlet of the valve to a location in the oil circulation circuit that is downstream of the cavity. In embodiments, the flow inlet and the second flow outlet of the valve are part of the oil circulation circuit at a location fluidly upstream of the cavity.

In embodiments, the valve can also include a reference port fluidly open to the body at a location relative to the body that is selected such that fluid pressure applied to the reference port opposes fluid pressure applied to the flow inlet, and the reference port can be connected to the oil tank to receive fluid pressure from the oil tank. In embodiments, the reference port can be connected to the oil tank at a location in the oil tank that is above a maximum oil level of the oil tank. In embodiments, the engine can further include an oil pump in the oil circulation circuit at a location downstream of the location in the oil circulation circuit that is downstream of the cavity to which the bypass conduit fluidly connects the first flow outlet of the valve, and wherein the oil pump is operable to pump oil toward.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
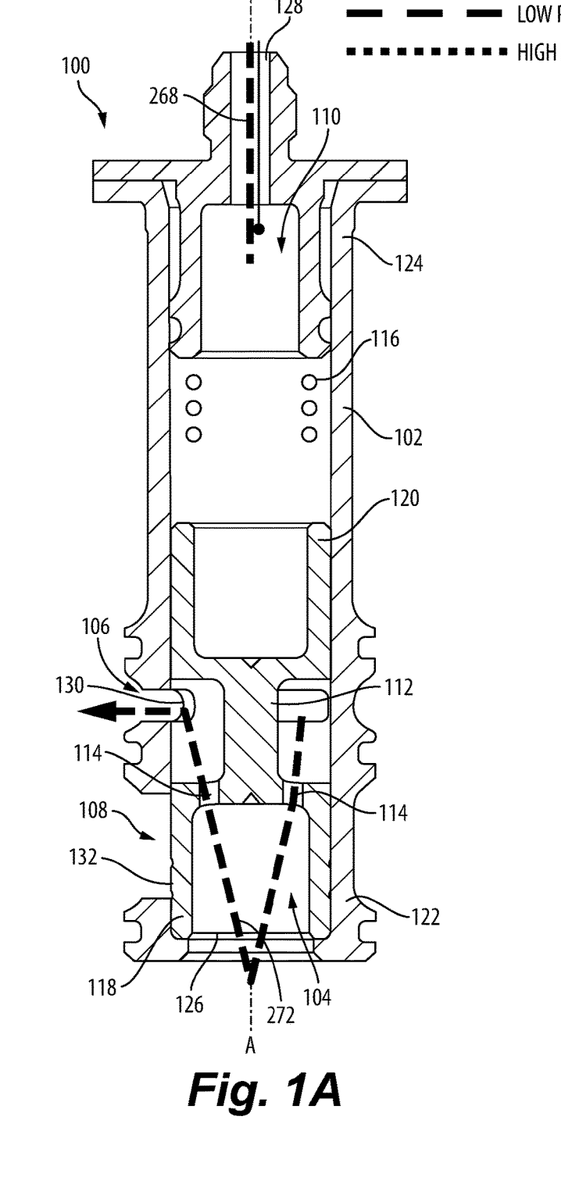
FIG. 1A is a schematic cross-sectional view of an embodiment of a valve in accordance with this disclosure, showing the valve in a first state.
Figure 1B:
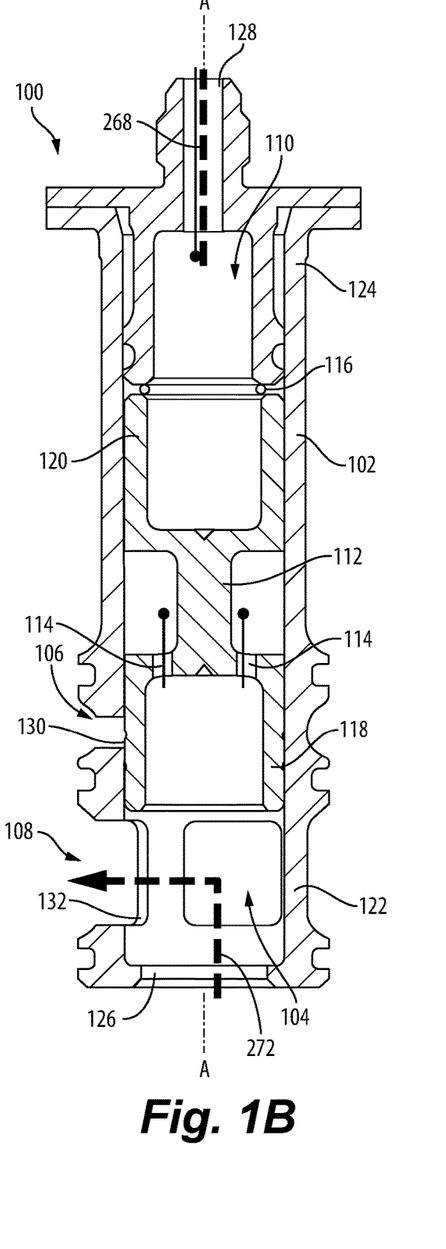
FIG. 1B is a schematic cross-sectional view of an embodiment of the valve of FIG. 1A, showing the valve in a second state.

Reference will now be made to the drawings wherein like reference numerals identify similar structural features or aspects of the subject disclosure. For purposes of explanation and illustration, and not limitation, an illustrative view of an embodiment of a valve in accordance with the disclosure is shown in FIGS. 1A and 1B and is designated generally by reference character 100. Other embodiments and/or aspects of this disclosure are shown in FIGS. 2A-7B.

In accordance with at least one aspect of this disclosure, there is provided a valve 100. The valve 100 includes a valve housing 102 (e.g., a cylindrical housing as shown) defining a flow inlet 104, first flow outlet 106, a second flow outlet 108, and a reference port 110. The valve includes a valve body 112 (e.g., a piston as shown) within the valve housing 102 configured to move within the housing 102 between a first position (e.g., as shown in FIG. 1A) and a second position (e.g., as shown in FIG. 1B) based on a pressure at the reference port 110. In the first position, the valve 100 is configured to fluidly communicate the flow inlet 104 and the first flow outlet 106 and in the second position the valve 100 is configured to fluidly communicate the flow inlet 104 and the second flow outlet 108. The piston 112 can include internal flow channels 114 which allow flow to pass through the piston 112 to the first flow outlet 106 in the first position. In the second position, flow that passes through the internal flow channels 114 is blocked by the piston from flowing to the reference port 110.

A biasing member 116 can be connected to the piston 112 and to the valve housing 102 configured to bias the piston 112 to the first position. The biasing member 116 also allows the piston 112 to move to the second position based on pressure at the reference port 110. The biasing member can be any suitable biasing member, for example including any one or more of a flexible member, a spring, a Belleville washer, a resilient member, or the like. In embodiments, a construction of the piston 112 and a biasing strength of the biasing member 116 can be selected such that when a fluid of the aircraft fluid system (e.g., system 200, 500 as described herein) acts at a predefined pressure on the piston 112 through the flow inlet 104, a force produced by the fluid on the piston 112 overcomes the biasing strength and thereby moves the piston toward the second position. The construction of the valve housing 102 and the piston 112 can be cylindrical as described herein, however it is contemplated that other geometries of the valve housing 102, piston 112, other biasing member weights, and/or configurations of the piston 112 and biasing member 116 within the valve housing 102 are contemplated herein.

In embodiments, the piston can be translatable axially in the housing 102 and has opposed axial sides, the flow inlet can be disposed on one of the opposed axial sides, and the reference port is fluidly open to the other one of the opposed axial sides. For example, the piston 112 can have a first end 118 and a second end 120, and the valve housing 102 can have a first end 122 and a second end 124. In embodiments, the flow inlet 104 can be at the first end 122 of the valve housing 102 and the reference port 110 can be at the second end 124 of the valve housing. The biasing member 116 can be disposed at the second end 124 of the valve housing 102, between the reference port 110 (or at least partially within the reference port) and the second end 120 of the piston 112. In embodiments, the reference port can be fluidly open to the piston 112 at a location relative to the piston 112 that is selected such that fluid pressure applied to the reference port 110 opposes fluid pressure applied to the flow inlet 104 (e.g., on opposite sides of the piston 112).

In certain embodiments, the valve housing 102 can define a longitudinal axis A extending from the first end 122 of the valve housing 102 to the second end 124 of the valve housing 102 and the piston 112 can be configured to translate axially within the valve housing 102 along the longitudinal axis A. In certain embodiments, (e.g., as shown in FIGS. 1A and 1B), an opening 126 of the flow inlet 104 can be defined at the first end 122 of the valve housing 102, opening axially such that a flow axis B at the flow inlet 104 is parallel to the longitudinal axis A. An opening 128 of the reference port 110 can be defined at the second end 124 of the valve housing 102, opening axially and in an opposite direction of the opening 126 of the flow inlet 104 such that a flow axis C of the reference port 110 is parallel to the longitudinal axis A.

In certain embodiments, such as shown in FIGS. 1A and 1B, an opening 130 of the first flow outlet 130 and an opening 132 of the second flow outlet 108 can be positioned such that a flow axis D of the first flow outlet and a flow axis E of the second flow outlet are oriented orthogonal to the longitudinal axis A. Stated differently, the openings 130, 132 of the first flow outlet 106 and the second flow outlet 108 are rotated 90 degrees relative to the opening 126 flow inlet 104. As shown in FIGS. 1A and 1B, the flow inlet 104 and the second flow outlet 108 can be the same size (e.g., the respective openings 126, 132 can have the same diameter), while the first flow outlet 106 can be a different size relative to the flow inlet 104 and the second flow outlet 108 (e.g., opening 130 is smaller than openings 126, 130, as shown).

Figure 2A:
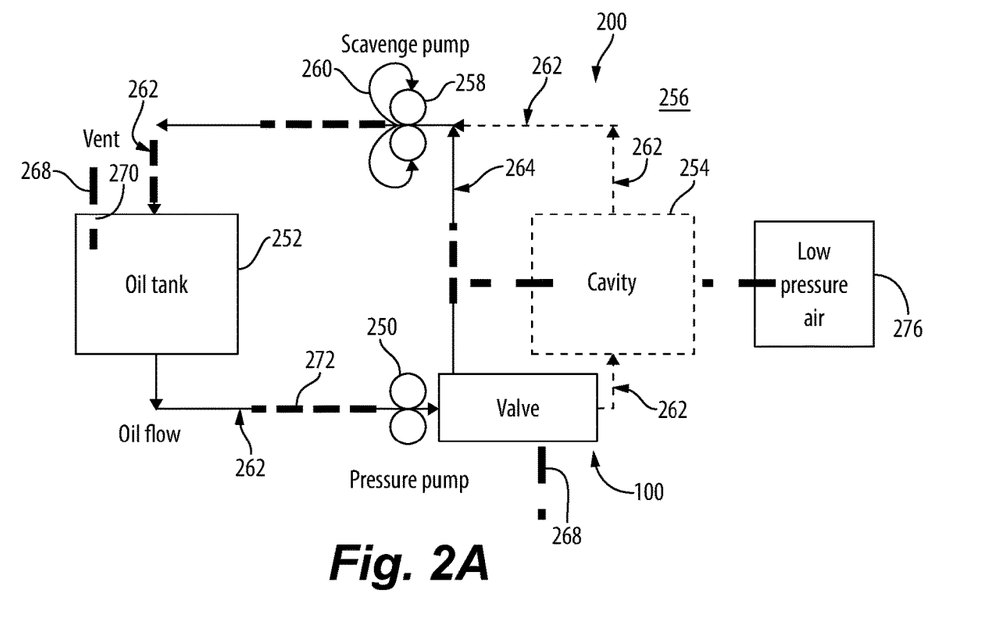
FIG. 2A is a schematic diagram of an embodiment of a system, showing a flow path through the valve of FIG. 1A, when the valve is in the first state.
Figure 2B:
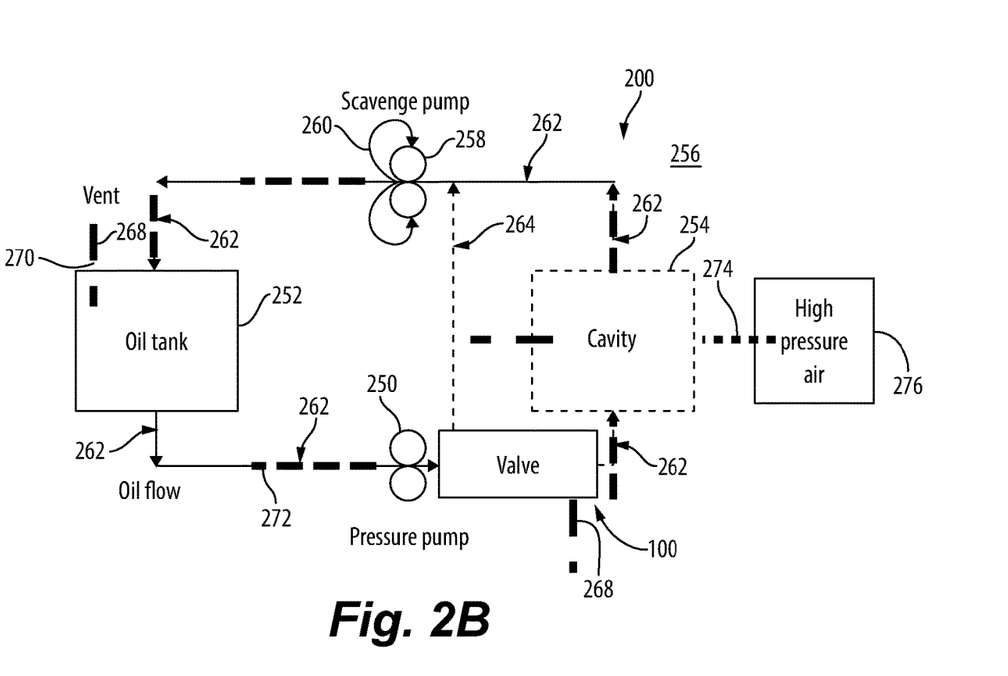
FIG. 2B is a schematic diagram of an embodiment of the system of FIG. 2A, showing a flow path through the valve of FIG. 1A, when the valve is in the second state.

In accordance with at least one aspect of this disclosure, as shown in FIGS. 2A and 2B, there is provided a system 200. In embodiments, the system 200 can include a first pump 250 (e.g., a pressure pump) configured to drive oil to from an oil tank 252 to a cavity 254 of an aircraft engine 256, a second pump 258 (e.g., a scavenge pump) configured drive spent oil from the cavity 254 back to the oil tank 252, and a valve disposed downstream of the first pump 252 and upstream of the cavity 254. The valve shown in FIGS. 2A and 2B can be the same or similar to valve 100 as shown in FIGS. 1A and 1B. For clarity and ease of understanding, the system 200 will be described as having the valve 100 therein, however, in view of this disclosure, one having ordinary skill in the art would readily appreciate that any embodiment of the valve shown and described herein (e.g., valves 300, 400) can be used in the system 200.

The oil tank 252 is disposed upstream of the first pump 250 and downstream of the second pump 258 and the cavity 254 disposed downstream of the first pump 250 and upstream of the second pump 258. The valve 100 can be configured to provide flow to the second pump 258 in both a first state and a second state of the valve to continuously lubricate (e.g., via lubrication path 260) the second pump 258 regardless of the state of the valve 100. In embodiments, in the first state of the valve 100 (e.g., wherein the piston 112 is in the first position as shown in FIG. 1A), flow from the oil tank 252 is allowed to pass from the valve 100 directly to the second pump 258 and is blocked from passing to the cavity 254 (e.g., as shown in FIG. 2A, where the flow path to the second pump 258 is shown in solid lines and the flow path to the cavity 254 is shown in hashed lines). In the second state of the valve 100 (e.g., wherein the piston 112 is in the second position as shown in FIG. 1B), flow from the oil tank 252 is allowed to pass from the valve 100 to the cavity 254 and is blocked from passing directly to the second pump 258 (e.g., as shown in FIG. 2B, where the flow path to the second pump 258 is shown in hashed lines and the flow path to the cavity 254 is shown in solid lines). In this state, the oil does still pass from though the valve 100 to the second pump 258, but it must go to the cavity 254 first. In embodiments, the first state of the valve 100 can correspond to a startup and/or transient (e.g., ramp up) condition of the aircraft engine 256 and the second state of the valve 100 can correspond to an operational and/or idle condition of the aircraft engine 256.

The system 200 can include a primary conduit 262 for fluidly communicating in series, the oil tank 252, the first pump 250, the valve 100, the cavity 254, and the second pump 258 in a circuit. A bypass conduit 264 can be included for fluidly communicating in series, the valve 100, and the second pump 258, bypassing the cavity 254.

In the first state of the valve 100, flow from the first pump is blocked from passing though the valve 100 to the cavity 254 via the primary conduit 262 but flow from the first pump 250 is passed through the valve 100 to the second pump 258 via the bypass conduit 264. This is shown in FIG. 2A. In the second state of the valve 100, flow from the first pump 250 passes though the valve 100 to the cavity 254 and to the second pump 258 via the primary conduit 262 but is blocked from passing through the valve 100 to the second pump 258 via the bypass conduit 264. This is shown in FIG. 2B. The valve therefore allows oil to be passed from the oil tank 252 to the second pump 258 when the valve 100 is both open and closed to the cavity 254 to continuously supply the lubrication path 260 of the second pump 258. This ensure one or more components of the second pump 258 (e.g., journal bearings) are always lubricated during operation of the second pump 258.

With reference now to FIGS. 1A to 2B, the valve 100 can be configured to move between the first state and the second state based on a single pressure reference (e.g., a pressure supplied to the second side 120 of the piston 112 via the reference port 110). In certain embodiments, the single pressure reference can be a low pressure air flow 268 fluidly connected to a vent 270 of the oil tank 252. When the valve 100 is in the first state, a pressure of the oil flow 272 on the first side 118 of the piston 112 is less than a pressure of the low pressure air flow 268 plus a bias force (e.g., supplied by the biasing member 116) on the second side 120 of the piston 112. The low pressure air flow 268 and the bias force maintain the valve 100 in the first state while the oil flow 272 pressurizes and rises to a pressure great enough to overcome the low pressure air flow 268 and the bias force. When the pressure of the oil flow 272 on the first side 118 of the piston 112 has increased to a pressure greater than the pressure of the low pressure air flow 268 plus the bias force on the second side 120 of the piston 112, the piston 112 moves into the second position, placing the valve 100 in the second state. The oil flow 272 maintains the valve 100 in the second state until the pressure of the oil flow 272 then drops below the pressure of the low pressure air flow 268 and the bias force, moving the valve 100 back into the first state. It should be understood that FIGS. 2A and 2B are schematic and therefore the relative positioning of any inlets/outlets of the valve 100 shown in FIGS. 2A and 2B may not correspond exactly to the relative positioning of any inlets/outlets of the valve shown in FIGS. 1A and 1B. In certain embodiments, the low pressure reference can include oil, and can be a hydrostatic pressure of the oil in the oil tank 252, which may be suitable for industrial or grounded engines.

Figure 3A:
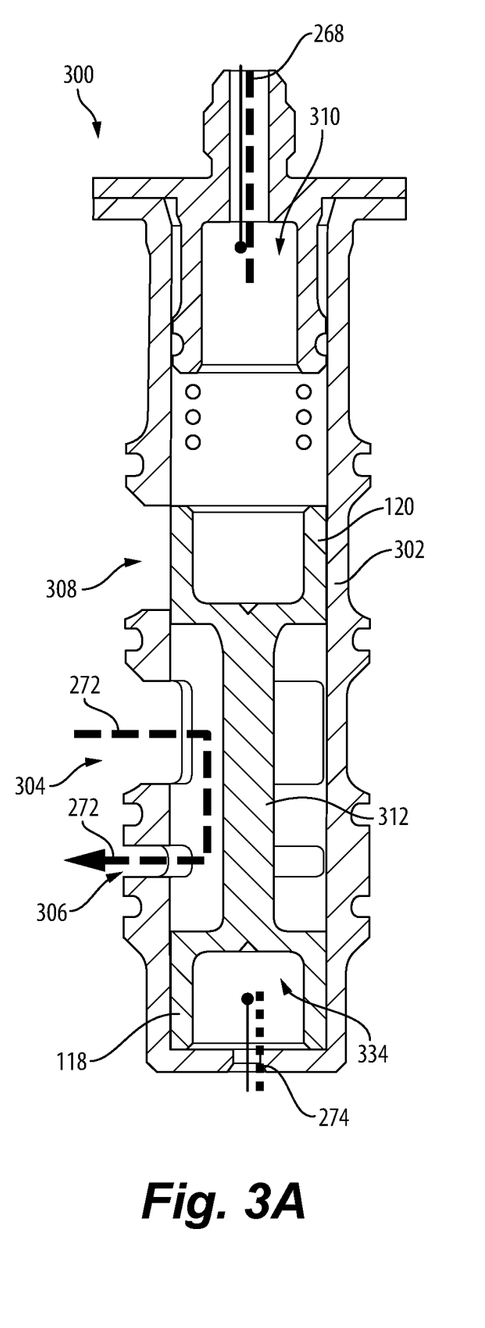
FIG. 3A is a schematic cross-sectional view of an embodiment of a valve in accordance with this disclosure, showing the valve in a first state.
Figure 3B:
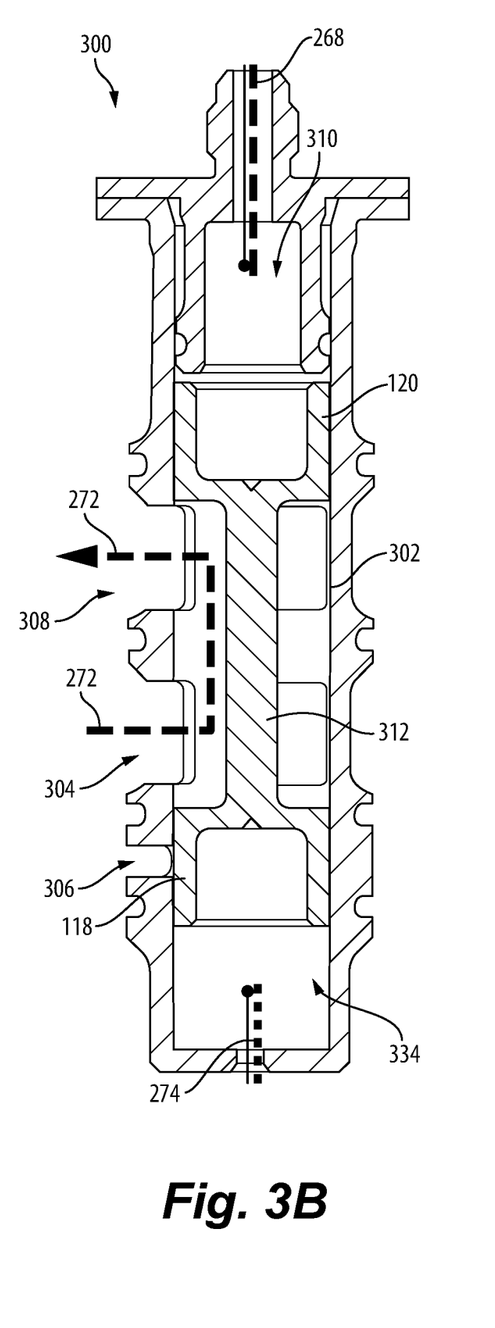
FIG. 3B is a schematic cross-sectional view of an embodiment of the valve of FIG. 3A, showing the valve in a second state.

In certain embodiments, with reference now to FIGS. 3A and 3B, the valve 300 can have similar components as shown and described with respect to valve 100. For brevity, the description of common elements that have been described above are not repeated with respect to FIGS. 3A and 3B. In the valve 300, the reference port 310 can be a first reference port, and the valve 300 can include a second reference port 334 defined in the valve housing 302 opposite the first reference port 310. The second reference port 334 can be defined in the valve housing 302 in the same location as the flow inlet 104 of valve 100, and the flow inlet 304 can be defined in the side of the valve housing 302 between the first and second flow outlets 306, 308, where the flow axis C of the flow inlet is orthogonal to the longitudinal axis A. Here, the piston 312 moves between the first and second position based on pressure at the first reference port 310 and the second reference port 334.

The first pressure reference can be a low pressure air flow 268 fluidly connected to the vent 270 of the oil tank 252 and a second pressure reference can be a high pressure air flow 274 fluidly connected to compressor section 276 of the aircraft engine 256. When the valve 300 is in the first state the pressure of the high pressure air flow 274 on the first side 118 of the piston 312 is less than a pressure of the low pressure air flow 268 plus the bias force acting on the second side 120 of the piston 312. The low pressure air flow 268 and the bias force maintain the valve 300 in the first state while the aircraft engine ramps up, the high pressure air flow 274 pressurizes further, rising to a pressure great enough to overcome the low pressure air flow 268 and the bias force. When the pressure of the high pressure air flow 274 on the first side 118 of the piston 312 has increased to a pressure greater than the pressure of the low pressure air flow 268 plus the bias force on the second side 120 of the piston 312, the piston 312 moves into the second position, placing the valve 300 in the second state. The high pressure air flow 274 maintains the valve 300 in the second state during idle and operational conditions of the aircraft engine 256, until the pressure of the high pressure air flow 274 then drops below the pressure of the low pressure air flow 268 and the bias force (e.g., as the engine 256 shuts down), moving the valve 300 back into the first state.

Figure 4A:
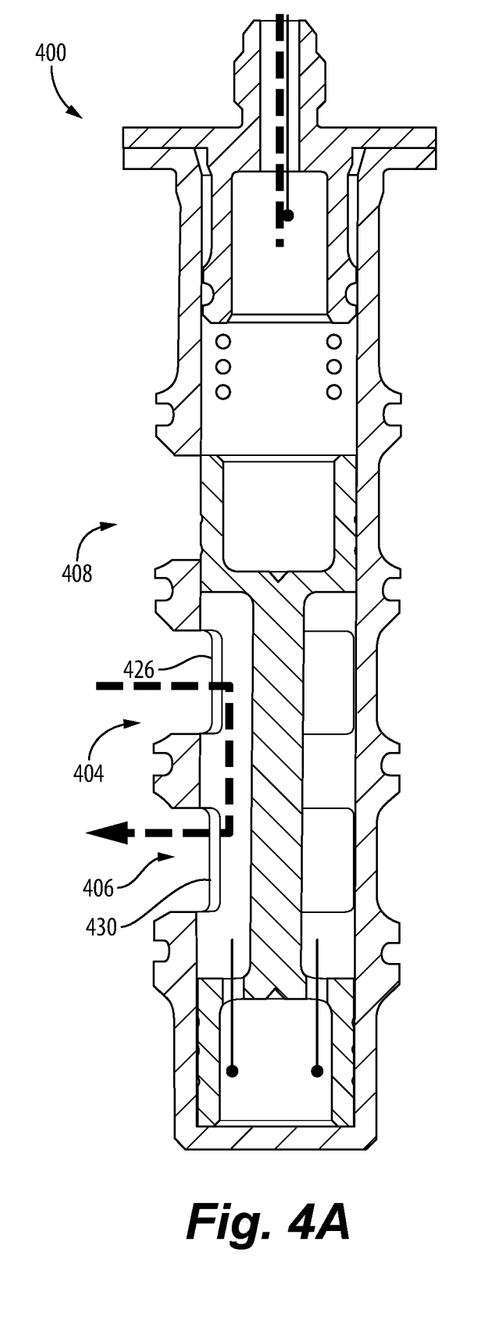
FIG. 4A is a schematic cross-sectional view of an embodiment of a valve in accordance with this disclosure, showing the valve in a first state.
Figure 4B:
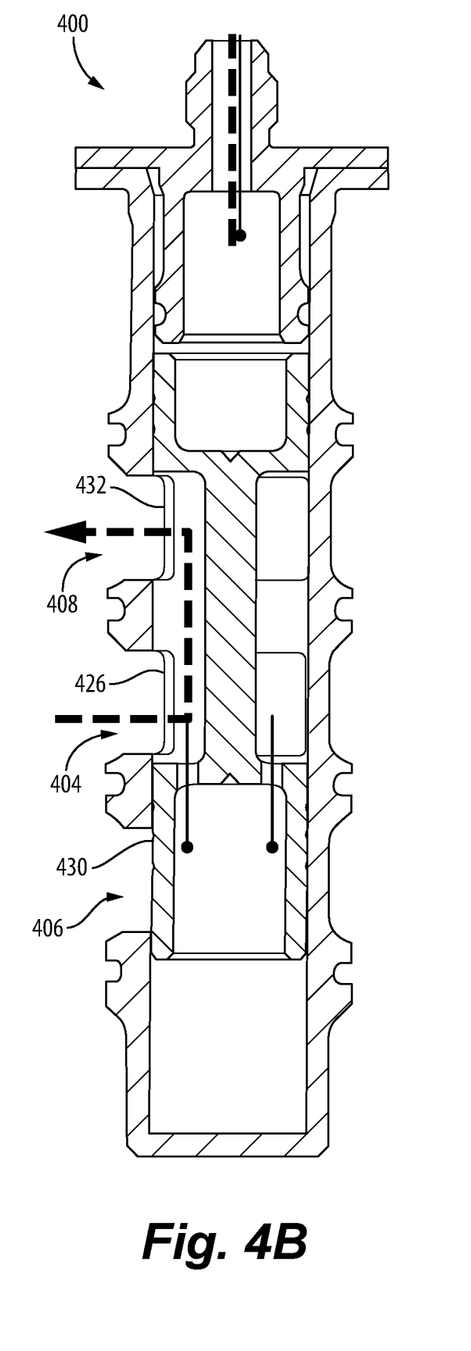
FIG. 4B is a schematic cross-sectional view of an embodiment of the valve of FIG. 4A, showing the valve in a second state.

In certain embodiments, as shown in FIGS. 4A and 4B, the valve 400 can have similar components as shown and described with respect to valve 300 and can operate in the same or a similar manner. For brevity, the description of common elements that have been described above with respect to valve 300 and shown in FIGS. 3A and 3B are not repeated with respect to FIGS. 4A and 4B. In the valve 400, the opening 426 of the flow inlet 404, the opening 430 of the first flow outlet 406, and the opening 432 of the second flow outlet 408 can all be same size (e.g., all have the same diameter). Further, the valve 400 can have a single reference port 410, as shown, and operate similar to that of valve 100, or the valve 400 can have two reference ports and operate similar to valve 300. If two reference ports are included in valve 400, flow channels 414 can be eliminated.

Traditional valves can be understood as conditional statements such as: if pressure difference is less than a threshold, do not send flow to flow outlets. However, such traditional valves can be used to only open and close once per engine mission, or can be used to regulate pressure by reacting to varying pressure references to bypass a proportionally varying amount of oil. Thus, traditional valves may not be optimal in certain application, such as the system 100 shown in FIGS. 2A and 2B because opening the outlet port open only occurs above a minimum pressure, or when pressure differential, is reached and it does not allow to switch between bypass ports depending on pressure differential.

Embodiments of the valve 100, 300, 400, and system 200 as shown and described herein can feature an open port when the valve is in a closed position. The valve (e.g., valve 100) can have a single low pressure reference, as depicted in FIGS. 1A and 1B, or the valve (e.g., valve 300, 400) can have or a low pressure reference and a high pressure reference, e.g., as depicted in FIGS. 3A-4B. FIGS. 1A, 3A, and 4A show the valves in both the closed and open positions, where the valve always allows flow to an outlet port (whether to the bypass conduit or the primary conduit as shown in FIGS. 2A and 2B. In embodiments, the bypass ports (e.g., the first flow outlet 106, 306, 406) can be smaller or equal to the inlet port (e.g., flow inlet 104, 304, 404) depending on the design of the valve for a given application. In embodiments, the two outlet ports can provide flow to the same cavity or accessory or can provide flow to difference cavities or accessories. As shown and described, the valve switches between the two outlet ports depending on the piston pressure balance. The addition of an open port in the closed position changes the conditional statement to: if pressure difference is less than a threshold, send flow to the first flow outlet, else, send flow to the second flow outlet.

In embodiments, the cavity sealing at a power condition from idle to maximum power rating can be achieved by surrounding the cavity with high pressure air rushing in controlled gap seals. This sealing mechanism may not be efficient in the start-up or transient conditions from engine shut down to GI. Including an oil delay valve upstream of the cavity (e.g., as shown) to prevent oil flow from reaching the cavity before the cavity reaches a sufficient pressure differential between the cavity and its surroundings can be beneficial. Further, embodiments include an existing scavenge pump from an existing engine that does not have its oil delay, which can reduce total part number for the system 200. In order to use the existing scavenge pump, the journal bearings need to be lubricated from the pressure side of each scavenge pump stage to minimize friction, power losses and wear between the rotating shaft and the static bores in the pump housing. If a traditional valve was used in the system 200, it would cut off flow of oil to the scavenge pump in sub-idle conditions and would force the scavenge pump journal bearings to run dry because no scavenge flow would come from the cavity during the oil delay period. This could significantly impact the useful life of the pump. Accordingly, embodiments of the valve 100, 300, 400 provide an oil delay valve with a flow outlet that would feed the scavenge pump inlet while delaying oil to the oil cavity (e.g., as shown in FIG. 2A). Embodiments therefore allow the system 200 to re-use a non-oil delay scavenge pump on an oil delay cavity.

In accordance with at least one aspect of this disclosure, and as shown in FIGS. 5-7B there is provided a fluid system 500 for an aircraft engine 556. While the fluid system 500 is described herein with respect to certain fluids, e.g., oil and/or air, it is envisioned that the fluid system 500 can use suitable for use with fluids other than oil, and the fluid system 500 can be used in one or more fluid applications within aerospace not specifically described herein.

Figure 5:
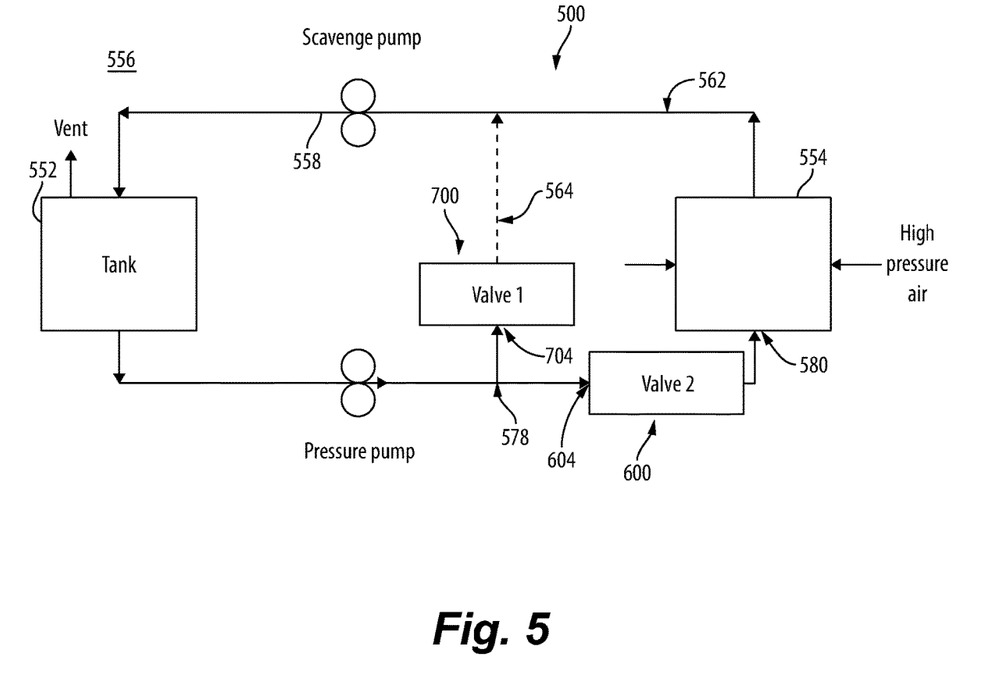
FIG. 5 is a schematic diagram of an embodiment of a system, showing a flow path through an embodiment of one or more valves.

In embodiments, e.g., as shown, the fluid system 500 can include a pumped fluid circulation circuit 562 including a fluid tank 552, wherein the fluid circulation circuit 562 is configured to circulate a fluid through at least a part of the aircraft engine 556. The fluid system 500 can include means, in the fluid circulation circuit, for selectively directing the fluid of the fluid circulation circuit 562 as a function of a pressure of fluid in the fluid circulation circuit to one of a part 554 of the aircraft engine 556 and/or a fluid bypass 564 in the fluid circulation circuit that is fluidly upstream of the part 554 of the aircraft engine 556.

In embodiments, the means for selectively directing the fluid can include a normally-closed valve 600 disposed, when the fluid system 500 is in use, fluidly between an inlet 578 of the fluid bypass 564 and an inlet 580 of the part 554 of the aircraft engine 556. The means for selectively directing the fluid can also include and a normally-open valve 700 disposed in the fluid bypass 564. In embodiments, the valves 600, 700 can be the same or similar in construction to the valves 100, 300, 400 as described above, except that valves 600, 700 may have only one outlet rather than two outlets. Further, the valves 600, 700, in embodiments, may be connected such that when the aircraft engine 556 spools up and pressure in the fluid system 500 increases, the normally-closed valve 600 opens to allow fluid to pass to the part 554 (e.g., a cavity) of the engine 556 and, either simultaneously or sequentially (as described further below) the normally-open valve 700 closes as a result of the pressure change.

Figure 6A:
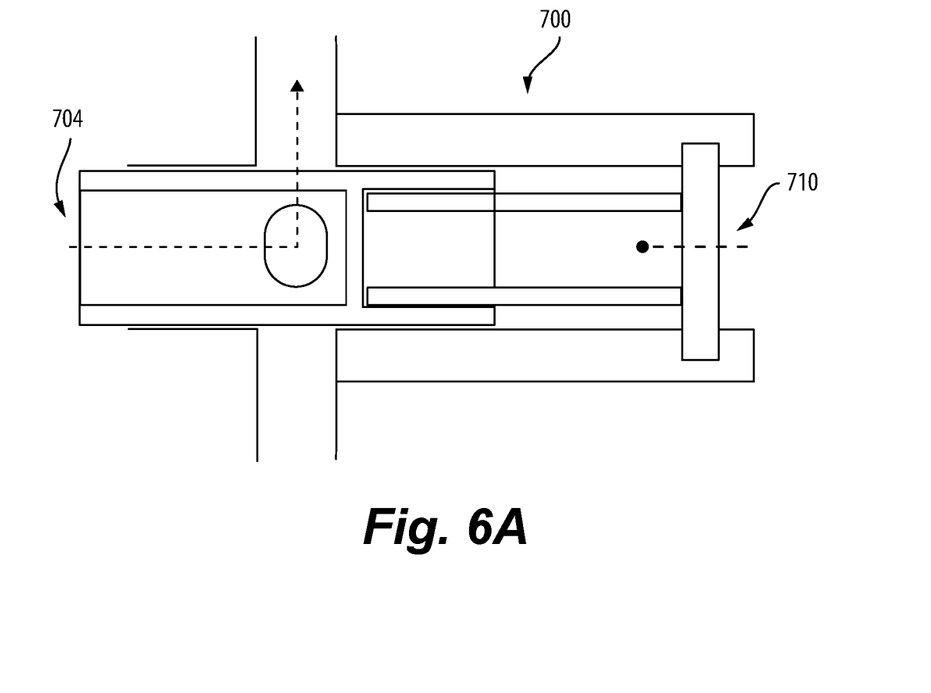
FIG. 6A is a schematic cross-sectional view of an embodiment of a normally-open valve shown in FIG. 5, the valve shown in an open position.
Figure 6B:
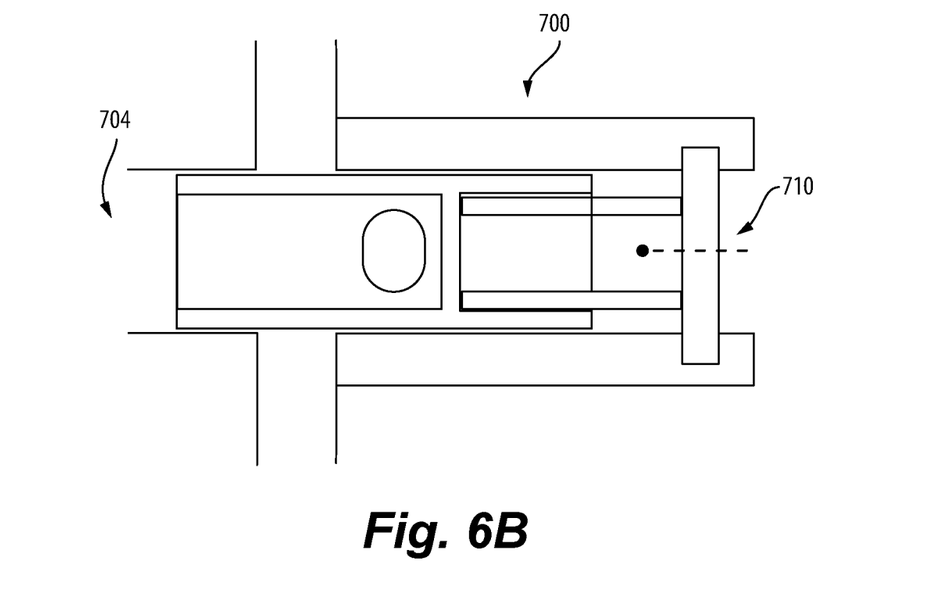
FIG. 6B is a schematic cross-sectional view of the valve of FIG. 6A shown in a closed position.
Figure 7A:
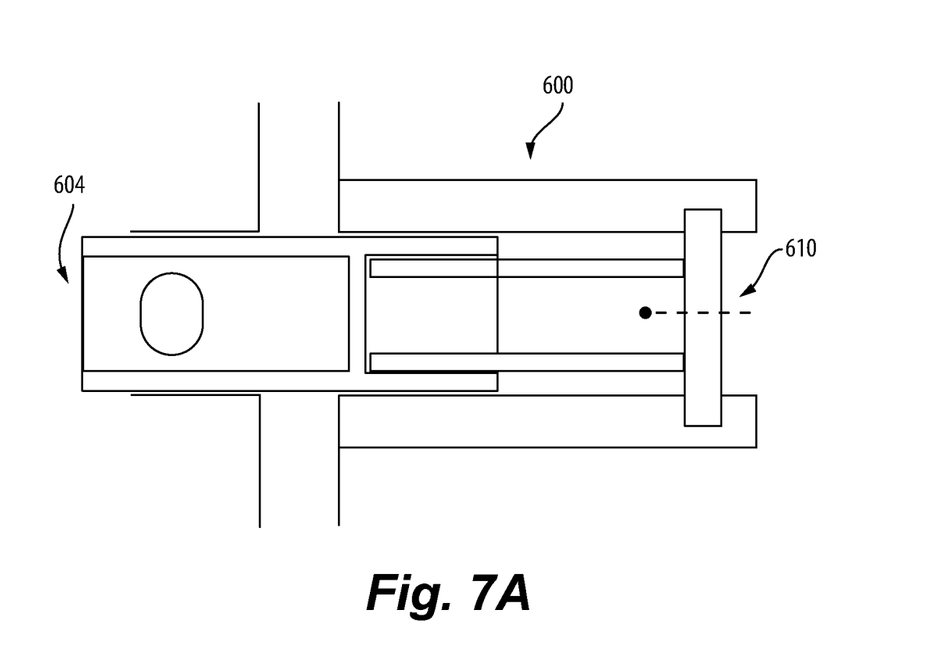
FIG. 7A is a schematic cross-sectional view of an embodiment of a normally-closed valve shown in FIG. 5, the valve shown in a closed position.
Figure 7B:
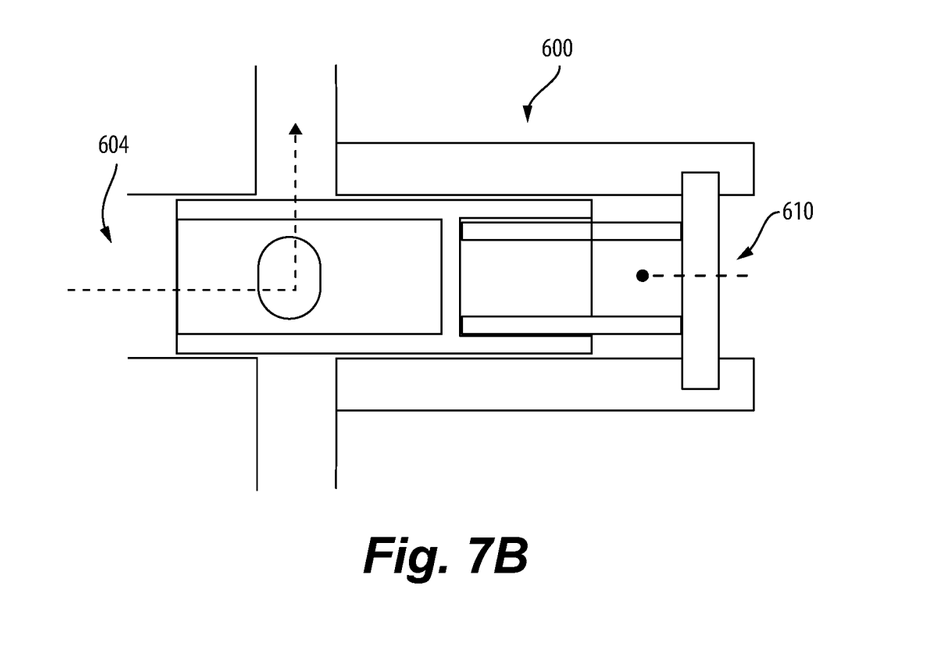
FIG. 7B is a schematic cross-sectional view of the valve of FIG. 7A shown in an open position.

In embodiments, the normally-closed valve 600 can be openable by fluid in the fluid circulation circuit 562 acting on an inlet 604 of the normally-closed valve 600 when pressure of the fluid at the inlet 604 of the normally-closed valve 604 exceeds a first predefined pressure threshold (e.g., as shown in FIGS. 7A and 7B). The normally-open valve 700 can be closeable by fluid in the fluid circulation circuit 562 acting on an inlet 704 of the normally-open valve 700 when pressure of the fluid at the inlet 704 of the normally-open valve 700 exceeds a second predefined pressure threshold (e.g., as shown in FIGS. 6A and 6B).

In certain embodiments, the first predefined pressure threshold can be lower than the second predefined pressure threshold, for example so that the normally-closed valve 600 is configured to open first to begin feeding the part 554 of the engine 556 before the normally-open valve 700 closes. In certain embodiments, the first predefined pressure threshold can be equal to the second predefined pressure threshold, for example so that a simultaneous switchover from fluid being directed to the bypass 564 to fluid being directed to the part 554 of the engine 556 can occur.

In certain embodiments, the means for selectively directing the fluid can include a single valve (e.g., any one of valves 100, 300, 400), in the fluid circulation circuit 562, which can be similar to the system 200 as shown in FIGS. 2A and 2B. The valve can include an inlet disposed fluidly upstream of an inlet of the fluid bypass, a first outlet fluidly connected to the inlet of the valve and to the inlet of the fluid bypass, a second outlet fluidly connected to the inlet of the valve and to an inlet of the part of the aircraft engine when the fluid system is installed in the aircraft engine, and means for diverting at least substantially all fluid flow from the inlet to one of the first outlet and the second outlet as fluid pressure at the inlet of the valve rises above a predefined pressure threshold. In embodiments, the means for diverting may be passive (e.g., as shown) or may be active (e.g., using an actuator with sensors).

In accordance with at least one aspect of this disclosure, there is provided an aircraft engine (e.g., engine 256, 556). The aircraft engine can include any one or more of the valves 100, 300, 400, 600, 700 as described herein. In embodiments, the engine can include a compressor section (e.g., compressor section 276) fluidly connected to air to a cavity (e.g., cavity 254, 554) of the aircraft engine, a pumped oil circulation circuit (e.g., circuit 262, 562) including an oil tank (e.g., tank 252, 552) and the cavity, and a bypass conduit (e.g., conduit 264, 564) fluidly connecting the first flow outlet of the valve to a location in the oil circulation circuit that is downstream of the cavity. In embodiments, the flow inlet and the second flow outlet of the valve are part of the oil circulation circuit at a location fluidly upstream of the cavity.

In embodiments, the valve can also include a reference port (e.g., port 110, 310, 410, 610, 710) fluidly open to the valve body 112 at a location relative to the body that is selected such that fluid pressure applied to the reference port opposes fluid pressure applied to the flow inlet, and the reference port can be connected to the oil tank to receive fluid pressure from the oil tank. In embodiments, the reference port can be connected to the oil tank at a location in the oil tank that is above a maximum oil level of the oil tank. In embodiments, the engine can further include an oil pump (e.g., pump 258, 558) in the oil circulation circuit at a location downstream of the location in the oil circulation circuit that is downstream of the cavity to which the bypass conduit fluidly connects the first flow outlet of the valve, and wherein the oil pump is operable to pump oil toward the oil tank.

As the engine power and cavity versus surrounding pressure, increases, the oil delay valve 100, 300, 400, 600 and 700 opens the flow path to lubricate the cavity and its hardware, but also stops directly flow of oil to the scavenge pump inlet flow as this flow is no longer needed because the lubricating function of the scavenge pump journal bearings flow is achieved by the flow coming from the cavity. Keeping the oil flow to the scavenge inlet (e.g., via the bypass conduit in both states of the valve) could require a bigger pressure pump and scavenge pump to cope for the increased flow. Thus, embodiments only provide direct flow of oil to the scavenge pump from the valve in sub-idle conditions, until oil is able to flow to the scavenge pump in normal operation via the primary conduit from the cavity. While embodiments of the valve 100, 300, 400 are shown as a passive valve, one or more embodiments including active control are contemplated herein. For example, in embodiments, the pressure port(s) may be removed and replaced with a controllable valve member (e.g., a solenoid) configured to move between the first and second positions based on a sensed pressure in a reference line at a location remote from the piston. In embodiments, said controllable valve can include any one or more of a hydraulically actuated valve, a hydro-mechanically actuated valve, a mechanically actuated valve, or an electronically actuated valve.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. An oil system for an aircraft engine, comprising:
 a first pump configured to drive oil to from an oil tank to
  a cavity of the aircraft engine;

a second pump configured drive spent oil from the cavity back to the oil tank;

a valve disposed downstream of the first pump and upstream of the cavity, configured to provide flow to the second pump in both a first state and a second state of the valve to continuously lubricate the second pump regardless of the state of the valve, wherein in the first state of the valve flow from the oil tank is allowed to pass from the valve directly to the second pump and is blocked from passing to the cavity, and wherein in the second state of the valve flow from the oil tank is allowed to pass from the valve to the cavity and is blocked from passing directly to the second pump; and a bypass conduit fluidly communicating in series the valve and the second pump, bypassing the cavity;

wherein the valve is configured to move between the first state and the second state based on a single pressure reference, wherein the single pressure reference is a low pressure air flow fluidly connected to a vent of the oil tank.

2. The system of claim 1, further comprising the oil tank disposed upstream of the first pump and downstream of the second pump, and further comprising the cavity disposed downstream of the first pump and upstream of the second pump.

3. The system of claim 2, further comprising, a primary conduit for fluidly communicating in series, the oil tank, the first pump, the valve, the cavity, and the second pump.

4. The system of claim 1, wherein in the first state of the valve, the valve is configured to block flow from the first pump from passing though the valve to the cavity via the primary conduit and to allow flow from the first pump to pass through the valve to the second pump via the bypass conduit.

5. The system of claim 1, wherein in the second state of the valve, the valve is configured to allow flow from the first pump to pass though the valve to the cavity via the primary conduit and to block flow from the first pump from passing through the valve to the second pump via the bypass conduit.

* * * * *